US012385793B2

(12) United States Patent
Kobayashi et al.

(10) Patent No.: US 12,385,793 B2
(45) Date of Patent: Aug. 12, 2025

(54) TORQUE MEASURING DEVICE

(71) Applicants: NSK LTD., Tokyo (JP); Proterial, Ltd., Tokyo (JP)

(72) Inventors: Masahiro Kobayashi, Fukuroi (JP); Kota Fukuda, Fukuroi (JP); Takahiro Odera, Fukuroi (JP); Naoki Futakuchi, Koto-ku (JP)

(73) Assignees: NSK LTD., Tokyo (JP); PROTERIAL, LTD., Tokyo (JP)

( * ) Notice: Subject to any disclaimer, the term of this patent is extended or adjusted under 35 U.S.C. 154(b) by 264 days.

(21) Appl. No.: 18/115,294

(22) Filed: Feb. 28, 2023

(65) Prior Publication Data

US 2023/0280221 A1  Sep. 7, 2023

(30) Foreign Application Priority Data

Mar. 1, 2022  (JP) ................. 2022-031026

(51) Int. Cl.
*G01L 3/10*  (2006.01)

(52) U.S. Cl.
CPC .............. *G01L 3/102* (2013.01); *G01L 3/108* (2013.01)

(58) Field of Classification Search
CPC ................................ G01L 3/102; G01L 3/108
See application file for complete search history.

(56) References Cited

U.S. PATENT DOCUMENTS

| | | | | |
|---|---|---|---|---|
| 4,907,462 A | * | 3/1990 | Obama | G01L 3/102 73/862.335 |
| 4,942,771 A | * | 7/1990 | Sugimoto | G01L 3/102 73/862.334 |
| 5,831,432 A | * | 11/1998 | Mohri | G01R 33/022 324/249 |
| 10,418,541 B2 | * | 9/2019 | Matsumoto | G01L 3/103 |
| 11,346,731 B2 | * | 5/2022 | Sugiyama | G01L 3/103 |
| 11,664,158 B2 | * | 5/2023 | Shimizu | H01F 41/096 29/605 |
| 11,774,305 B2 | * | 10/2023 | Nakamura | G01L 3/102 73/862.333 |
| 2007/0227268 A1 | * | 10/2007 | Ouyang | G01L 3/102 73/862.333 |
| 2016/0305833 A1 | | 10/2016 | Nakamura | |
| 2017/0162784 A1 | * | 6/2017 | Banno | H10N 70/8416 |
| 2018/0166630 A1 | * | 6/2018 | Tada | H10N 70/826 |
| 2021/0278296 A1 | * | 9/2021 | Sugiyama | G01L 3/103 |

FOREIGN PATENT DOCUMENTS

JP  2016-200552 A  12/2016
JP  2017-049124 A  3/2017

* cited by examiner

*Primary Examiner* — Freddie Kirkland, III
(74) *Attorney, Agent, or Firm* — Sughrue Mion, PLLC

(57) ABSTRACT

A torque measuring device includes a bridge circuit in which four detection coils arranged around a magnetostrictive effect section of a rotating shaft are arranged on four sides; and the bridge circuit includes a resistance element connected to at least one of the four sides for adjusting a resistance value of the side.

5 Claims, 10 Drawing Sheets

TORQUE MEASURING DEVICE

CROSS REFERENCE TO RELATED APPLICATIONS

This patent application claims the benefit of JP Patent Application No. 2022-031026 filed Mar. 1, 2022. The above application is incorporated by reference herein.

FIELD

The present disclosure relates to a torque measuring device capable of measuring torque transmitted by a rotating shaft.

BACKGROUND

In recent years, in the field of automobiles, the development of systems that measure torque transmitted by a rotating shaft of a power train, or in other words, a power transmission mechanism, use the measurement results to control output of an engine or an electric motor that is a power source, and execute speed change control of a transmission is advancing.

Conventionally, a magnetostrictive torque measuring device is known as a device for measuring torque transmitted by a rotating shaft. A magnetostrictive torque measuring device is configured to measure torque being transmitted by a rotating shaft having a magnetostrictive effect section whose magnetic permeability changes when torque is applied, and detecting the change in magnetic permeability of the magnetostrictive effect section when torque is applied as a change in the inductance of a detection coil.

In general, the change in magnetic permeability of the magnetostrictive effect section due to fluctuation in torque is very small, and therefore, measures are usually taken to improve the measurement sensitivity. As one such measure, a method of using a bridge circuit 100 as illustrated in FIG. 9 is known as disclosed in JP 2016-200552 A, JP 2017-049124 A, or the like. In this method, as illustrated in FIG. 10, for example, a first detection coil 103, a second detection coil 104, a third detection coil 105, and a fourth detection coil 106, which are four detection coils of a bridge circuit 100, are arranged around a columnar magnetostrictive effect section 102, which is a part of a rotating shaft 101 in the axial direction.

When a torque T is applied to the rotating shaft 101, stresses 6 with different positive and negative signs act on an outer peripheral surface of the magnetostrictive effect section 102 in directions inclined +45° and −45° with respect to the axial direction. Due to an inverse magnetostriction effect, the magnetic permeability increases in a direction in which the tensile stress (+σ) acts, and decreases in the direction in which the compressive stress (−σ) acts.

In the bridge circuit 100, the first detection coil 103 (inductance L1) and the third detection coil 105 (inductance L3) arranged as one set of two sets of opposite sides forming the four sides are arranged on the outer peripheral surface of the magnetostrictive effect section 102, and are detection coils for detecting a change in magnetic permeability in a direction inclined +45° with respect to the axial direction, and the second detection coil 104 (inductance L2) and the fourth detection coil 106 (inductance L4) arranged as another set of two sets of opposite sides are arranged on the outer peripheral surface of the magnetostrictive effect section 102, and are detection coils for detecting a change in magnetic permeability in a direction inclined −45° with respect to the axial direction.

In such a bridge circuit 100, when an input voltage Vi is applied between two end points, points A and C, an output voltage Vo corresponding to a direction and a magnitude of torque T applied to the rotating shaft 101 is obtained as voltage between two midpoints, points B and D. Therefore, the torque T can be measured based on the output voltage Vo.

By using the bridge circuit 100 as described above, it is possible to measure the torque T with twice the sensitivity as compared with a case in which torque T is measured by detecting only the change in magnetic permeability in one of the +45° inclined direction and −45° inclined direction with respect to the axial direction.

SUMMARY

However, in general, each of the first detection coil 103, the second detection coil 104, the third detection coil 105, and the fourth detection coil 106 has resistance components r1, r2, r3, and r4 represented by copper wire resistance, and variations in these resistance components r1, r2, r3, and r4 affect the output voltage Vo of the bridge circuit 100. More specifically, these resistance components r1, r2, r3, and r4 increase and decrease with changes in temperature, that is, with changes in the electrical resistivity of copper, and the output voltage Vo also increases and decreases with the increase and decrease of the resistance components r1, r2, r3, and r4.

Then, the amount of change in the output voltage Vo with respect to the temperature change at this time increases as the variations in the resistance components r1, r2, r3, and r4, that is, the variations in the resistance values of the four sides of the bridge circuit 100 increase.

An object of the present disclosure is to provide a torque measuring device capable of suppressing changes in output voltage of a bridge circuit due to temperature changes.

A torque measuring device according to an aspect of the present disclosure includes a bridge circuit in which four detection coils arranged around a magnetostrictive effect section of a rotating shaft are arranged on four sides. The bridge circuit includes a resistance element connected to at least one of the four sides for adjusting a resistance value of the side.

In the torque measuring device according to an aspect of the present disclosure, a resistance element is connected to each of the four sides.

In the torque measuring device according to an aspect of the present disclosure, the resistance value of the resistance element connected to the at least one of the four sides is adjusted so that the ratio (R1×R3)/(R2×R4) of a product R1×R3 of resistance values R1 and R3 of two opposite sides forming one pair of opposite sides of the four sides, and a product R2×R4 of resistance values R2 and R4 of two opposite sides forming another pair of opposite sides of the four sides approaches 1 compared to a case in which the resistance element is not connected to each of the four sides.

In the torque measuring device according to an aspect of the present disclosure, the resistance element has a configuration in which the resistance value between end points on both sides of the resistance element, which is the resistance value of the resistance element, is adjustable by changing a path length of copper wiring connecting the end points on both sides of the resistance element.

In the torque measuring device according to an aspect of the present disclosure, the resistance element has a configuration in which a plurality of parallel copper wires are connected in parallel in the middle of the copper wiring connecting the end points on both sides of the resistance element, and the resistance value between the end points on both sides, which is the resistance value of the resistance element, is adjustable by changing the number of the plurality of parallel copper wires by cutting a part of the plurality of parallel copper wires.

The torque measuring device according to an aspect of the present disclosure includes a coil unit formed in a cylindrical shape and having the four detection coils, a back yoke formed in a cylindrical shape and arranged coaxially around the coil unit, and a holder configured to hold the coil unit and the back yoke.

With the torque measuring device according to an aspect of the present disclosure, it is possible to suppress changes in output voltage of a bridge circuit due to temperature changes.

BRIEF DESCRIPTION OF THE DRAWINGS

To assist those of ordinary skill in the relevant art in making and using the Subject matter hereof, reference is made to the appended drawings, in which like reference numerals refer to similar elements.

It should be understood that the drawings are not to scale and that the disclosed embodiments are sometimes illustrated diagrammatically and in partial views. In certain instances, details that are not necessary for an understanding of the disclosed method and apparatus, or that would render other details difficult to perceive may have been omitted. It should be understood that this disclosure is not limited to the particular embodiments illustrated herein.

DETAILED DESCRIPTION

In the following detailed description of some embodiments, reference is made to the accompanying drawings, which form a part hereof, and within which are shown by way of illustration specific embodiments by which the disclosure may be practiced. It is to be understood that other embodiments may be utilized, and structural changes may be made without departing from the scope of the disclosure.

First Example

A first example of an embodiment of the present disclosure will be described with reference to FIGS. 1 to 7.

A torque measuring device 1 of this example is a device for measuring the torque transmitted by a rotating shaft 2, and can be used by being incorporated in various mechanical devices. Specific examples of a mechanical device incorporating the torque measuring device 1 of the present example include: a mechanical device of a power train of an automobile, for example, a transmission such as an automatic transmission (AT), a belt-type continuously variable transmission, a toroidal type continuously variable transmission, an automatic manual transmission (AMT), a dual clutch transmission (DCT) or the like that performs gear shifting that is controlled on the vehicle side; or a transfer, a manual transmission (MT), or the like. The driving system of the target vehicle is not particularly limited and may be FF, FR, MR, RR, 4WD, or the like.

Specific examples of the other mechanical devices incorporating the torque measuring device 1 of the present example include devices that change a rotation speed of a power shaft with gears such as a speed reducer or a speed increaser of a wind turbine, a railway vehicle, a rolling mill for steel, and the like.

In this example, the rotating shaft 2 is a rotating shaft incorporated in a mechanical device of a power train as described above, and is rotatably supported by a rolling bearing (not illustrated) with respect to a casing (not illustrated) that does not rotate during use, and has a magnetostrictive effect section, the magnetic permeability of which changes according to torque to be transmitted.

Figure 1:
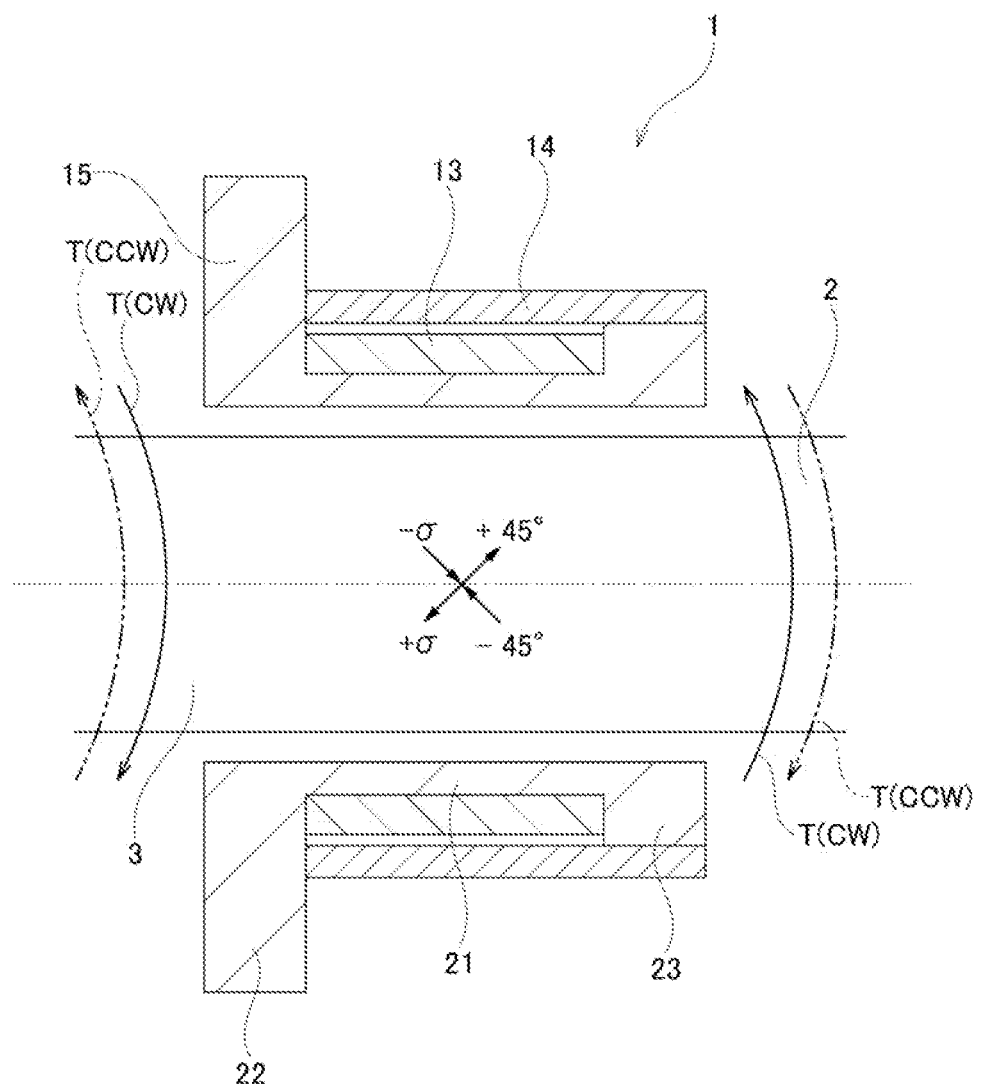
FIG. 1 is a cross-sectional view of a torque measuring device according to a first example of an embodiment of the present disclosure.

The rotating shaft 2 has an intermediate shaft portion 3 at an intermediate portion in an axial direction thereof as illustrated in FIG. 1. An outer peripheral surface of the intermediate shaft portion 3 is configured by a cylindrical surface. In this example, the intermediate shaft portion 3 of the rotating shaft 2 functions as a magnetostrictive effect section. For this reason, the rotating shaft 2 is made of a magnetic metal. As the magnetic metal forming the rotating shaft 2, various magnetic steels can be used such as carburized steel such as SCr420 and SCM420, and carbon steel such as S45C, which are defined in the Japanese Industrial Standards (JIS).

When a torque T is applied to the rotating shaft 2, stresses 6 with differing positive and negative signs act on the outer peripheral surface of the intermediate shaft portion 3 in directions inclined +45° and −45° with respect to the axial direction. Due to an inverse magnetostriction effect, the magnetic permeability increases in a direction in which the tensile stress (+σ) acts, and decreases in the direction in which the compressive stress (−σ) acts.

When carrying out the present disclosure, it is possible to improve the mechanical and magnetic properties of a portion of the outer peripheral surface of the intermediate shaft portion 3 around which the detection coils 5 to 8 of the torque measuring device 1 are arranged by subjecting the portion to a shot peening process to form a compression work hardened layer. In this way, sensitivity and hysteresis of torque measurement by the torque measuring device 1 may be improved.

When carrying out the present disclosure, instead of having the intermediate shaft portion 3 function as the magnetostrictive effect section, it is also possible to fix a magnetostrictive material functioning as the magnetostrictive effect section to an outer peripheral surface of the intermediate shaft portion 3. More specifically, an annular-shaped magnetostrictive material may be fitted around the intermediate shaft portion 3 and fixed, or a magnetostrictive material composed of a film coating such as plating or a film-like magnetostrictive material may be fixed to the outer peripheral surface of the intermediate shaft portion 3.

Figure 2:
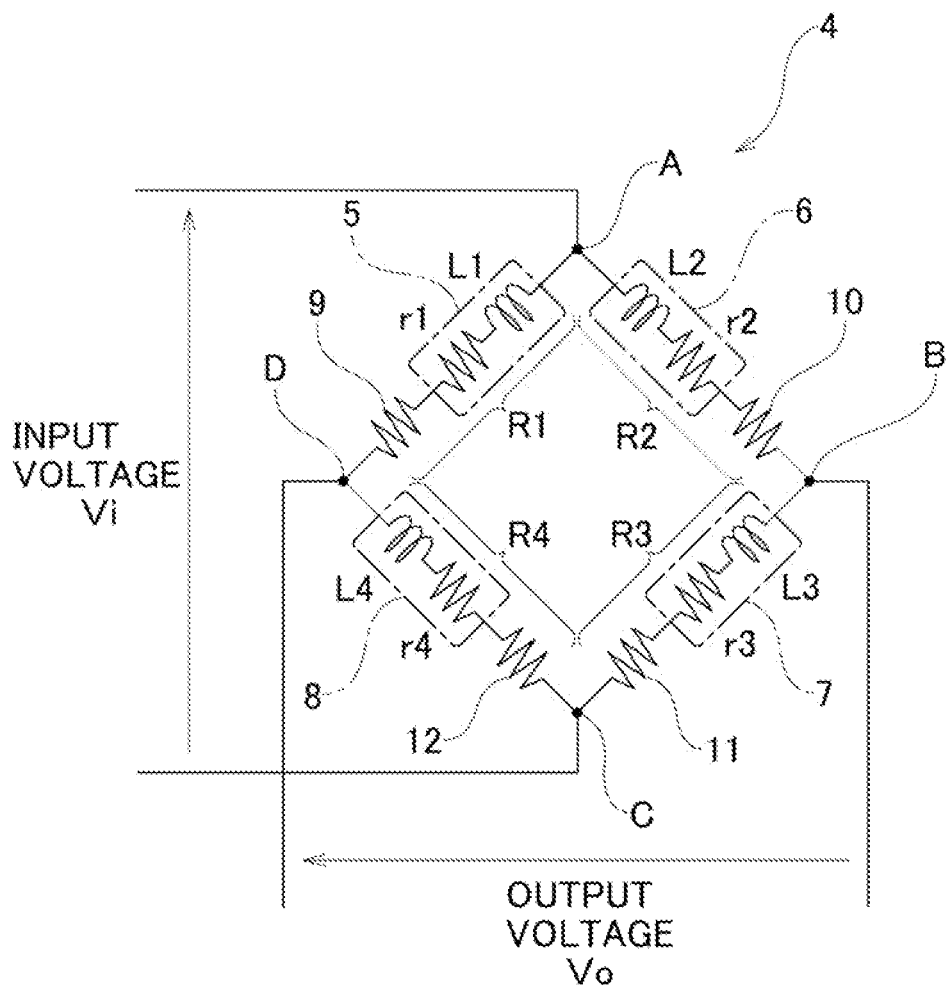
FIG. 2 is a diagram illustrating a bridge circuit of the torque measuring device of the first example.

The torque measuring device 1 of this example includes a bridge circuit 4 as illustrated in FIG. 2. On the four sides of the bridge circuit 4, four detection coils composed of a first detection coil 5, a second detection coil 6, a third detection coil 7, and a fourth detection coil 8, are arranged around the intermediate shaft portion 3.

The bridge circuit 4 has two end points, point A and point C, and two midpoints, point B and point D. The first detection coil 5 is arranged on the side between point D and point A. The second detection coil 6 is arranged on the side between point A and point B. The third detection coil 7 is arranged on the side between point B and point C. The fourth detection coil 8 is arranged on the side between point C and point D.

In the bridge circuit 4, one of two sets of opposite sides of the four sides, that is, the first detection coil 5 and the third detection coil 7 arranged on the side between points D and A and on the side between points B and C are detection coils on the outer peripheral surface of the intermediate shaft portion 3 for detecting a change in magnetic permeability in a direction inclined +45° with respect to the axial direction, or in other words, are detection coils in which respective inductances L1 and L3 thereof change as magnetic permeability in that direction changes.

Another of the two sets of opposite sides of the four sides, that is, the second detection coil 6 and the fourth detection coil 8 arranged on the side between points A and B and on the side between points C and D are detection coils on the outer peripheral surface of the intermediate shaft portion 3 for detecting a change in magnetic permeability in a direction inclined −45° with respect to the axial direction, or in other words, are detection coils in which respective inductances L2 and L4 thereof change as magnetic permeability in that direction changes.

The bridge circuit 4 has a resistance element connected to at least one side of the four sides for adjusting the resistance value of the side. In this example, a resistance element is connected to each of the four sides of the bridge circuit 4. That is, in this example, the bridge circuit 4 includes a first resistance element 9, a second resistance element 10, a third resistance element 11 and a fourth resistance element 12 as the four resistance elements connected to each of the four sides for adjusting the resistance value of the sides.

More specifically, in this example, the first resistance element 9 is connected in series with the first detection coil 5 on the side between the point D and point A. The second resistance element 10 is connected in series with the second detection coil 6 on the side between the point A and point B. The third resistance element 11 is connected in series with the third detection coil 7 on the side between the point B and point C. The fourth resistance element 12 is connected in series with the fourth detection coil 8 on the side between the point C and point D. However, when carrying out the present disclosure, a resistance element may also be connected in parallel with the detection coil on each side of the bridge circuit.

In the bridge circuit 4, the resistance value of each of the four sides can be adjusted by changing the resistance value of the resistance element connected to the side. More specifically, the resistance value R1 between the points D and A can be adjusted by changing the resistance value of the first resistance element 9. The resistance value R2 between the points A and B can be adjusted by changing the resistance value of the second resistance element 10. The resistance value R3 between the points B and C can be adjusted by changing the resistance value of the third resistance element 11. The resistance value R4 between the points C and D can be adjusted by changing the resistance value of the fourth resistance element 12.

In this example, in the bridge circuit 4, the resistance values of resistance elements 9 to 12 connected to each of the four sides are adjusted so that the ratio (R1×R3)/(R2×R4) of the product R1×R3 of the resistance values R1 and R3 of two opposite sides of the four sides, that form a set of opposite sides, in other words, the side between points D and A and the side between points B and C, and the product R2×R4 of the resistance values R2 and R4 of two opposite sides of the four sides, that form another set of opposite sides, in other words, the side between points A and B and the side between points C and D approaches 1 compared to a case where the resistance elements 9 to 12 are not connected to each of the four sides.

For this reason, in this example, before connecting the resistance elements 9 to 12 to the four sides of the bridge circuit 4, resistance values of respective resistance components r1, r2, r3, and r4 of the first detection coil 5, the second detection coil 6, the third detection coil 7, and the fourth detection coil 8 are measured with a tester. The resistance values of the resistance components r1, r2, r3, and r4 that are measured in this way, and the resistance values of the resistance elements 9 to 12 are combined, and the resistance values of the resistance elements 9 to 12 are adjusted so that the ratio (R1×R3)/(R2×R4) approaches 1.

For example, the resistance values of the resistance elements 9 to 12 are adjusted so that, of the detection coils 5 to 8 on the four sides, the larger the resistance values of the resistance components r1, r2, r3, and r4 measured by the tester, the smaller the resistance value of the resistance element connected to the detection coil, and so that the ratio (R1×R3)/(R2×R4) approaches 1. Alternatively, the resistance values of the resistance elements 9 to 12 are adjusted so that the resistance values of two or three of the resistance elements 9 to 12 are set to the same magnitude, and the resistance values of the remaining resistance elements are set so that the ratio (R1×R3)/(R2×R4) approaches 1.

Note that the resistance values of the resistance elements 9 to 12 may be adjusted by other methods. After adjusting the resistance values as described above, the resistance elements 9 to 12 are connected to the four sides of the bridge circuit 4.

The bridge circuit 4 includes an oscillator (not illustrated) that applies an input voltage Vi, which is an AC voltage between two end points, point A and point C, and a voltage measuring portion (not illustrated) that detects an output voltage Vo, which is a voltage between two midpoints, point B and point D. In the bridge circuit 4, when an input voltage Vi is applied between the two end points, point A and point C, by the oscillator, an output voltage Vo corresponding to a direction and a magnitude of the torque T applied to the rotating shaft 2 is obtained as a voltage between the two midpoints, point B and point D. Therefore, when this output voltage Vo is measured by the voltage measuring portion, the direction and magnitude of the torque T can be obtained based on the measured output voltage Vo.

The torque measuring device 1 of this example has an annular shape as a whole, and is supported and fixed to the casing while being arranged coaxially around the intermediate shaft portion 3. The torque measuring device 1 of this example includes a coil unit 13, a back yoke 14, and a holder 15.

In the present example, the first detection coil 5, the second detection coil 6, the third detection coil 7, the fourth detection coil 8, and the first resistance element 9, the second resistance element 10, the third resistance element 11, and the fourth resistance element 12 of the bridge circuit 4 are provided in the coil unit 13. In this example, the coil unit 13 is configured in a cylindrical shape as a whole by a flexible substrate (FPC) having a base film and printed wiring (conductors) held by the base film, and is arranged coaxially around the intermediate shaft portion 3 of the rotating shaft 2.

More specifically, in this example, the coil unit 13 is formed by rolling a band-shaped flexible substrate 16 as illustrated in FIG. 13 into a cylindrical shape, and by joining together, for example, both end portions in the length direction of the flexible substrate 16. The flexible substrate 16 has four wiring layers that are layered in the thickness direction, and the first detection coil 5, the second detection coil 6, the third detection coil 7, and the fourth detection coil 8, each of which is configured by printed wiring, are arranged on these wiring layers.

In a state in which the band-shaped flexible substrate 16 is rolled into a cylindrical shape, that is, in a state in which the cylindrical coil unit 13 is formed, the detection coils 5 to 8 are arranged in order of the first detection coil 5, the second detection coil 6, the fourth detection coil 8, and the third detection coil 7 from the inner side in the radial direction.

Figure 4:
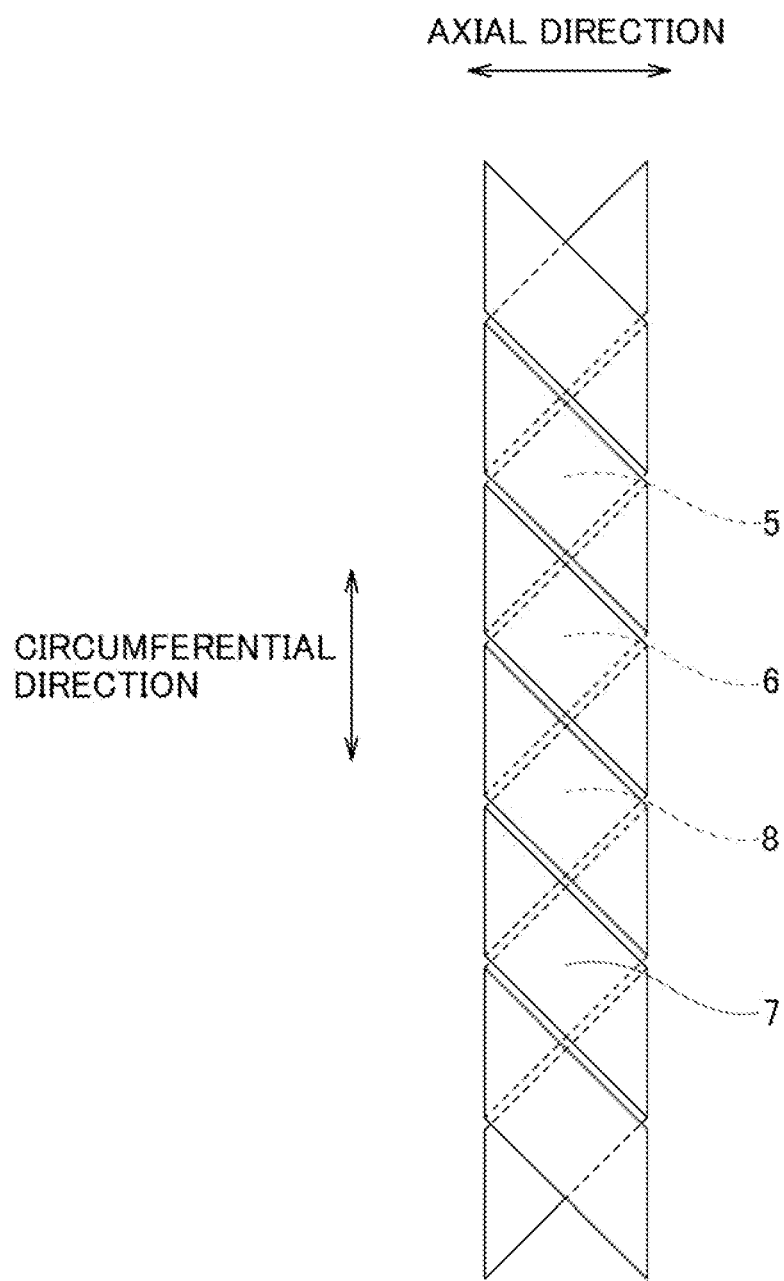
FIG. 4 is a developed view of a first detection coil, a second detection coil, a third detection coil, and a fourth detection coil of the coil unit of the torque measuring device of the first example, as viewed from the outside in the radial direction.
Figure 5:
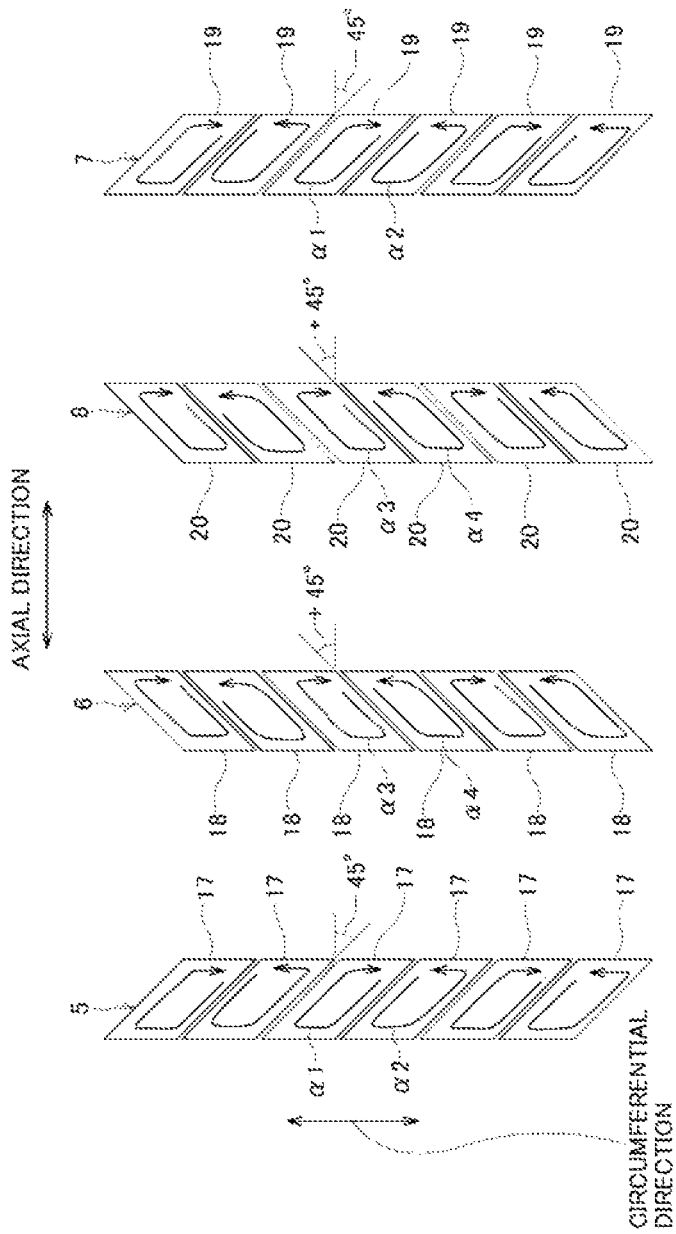
FIG. 5A to FIG. 5D respectively illustrate a first detection coil, a second detection coil, a third detection coil, and a fourth detection coil of the coil unit of the torque measuring device of the first example, and are developed views of each single unit thereof viewed from the outside in the radial direction.

FIG. 4 illustrates a developed view of the first detection coil 5, the second detection coil 6, the third detection coil 7, and the fourth detection coil 8 as seen from the outer side in the radial direction of the coil unit 13. FIG. 5A to FIG. 5D illustrate developed views of the detection coils 5 to 8 in a single state as seen from the outside in the radial direction of the coil unit 13.

As illustrated in FIG. 5A, the first detection coil 5 includes a plurality of coil pieces 17 arranged side by side at equal pitches in a circumferential direction. These coil pieces 17 have a parallelogram shape when viewed from the radial direction, and include wiring that is inclined −45° with respect to the axial direction of the intermediate shaft portion 3. Coil pieces 17 that are adjacent in the circumferential direction are connected in series by a conductor such as printed wiring (not illustrated).

In FIG. 5A, the coil pieces 17 are schematically illustrated, and illustrated as if the entire circumference is connected; however, actually, discontinuous portions exist in a part of the coil pieces 17 in the circumferential direction. The coil pieces 17 have two end portions that are separated across discontinuous portions. Coil pieces 17 that are adjacent in the circumferential direction are connected in series by connecting one end portion of each with a conductor such as printed wiring (not illustrated). These aspects are the same for the second detection coil 6 to the fourth detection coil 8 below.

As illustrated in FIG. 5B, the second detection coil 6 includes a plurality of coil pieces 18 arranged side by side at equal pitches in the circumferential direction. These coil pieces 18 have a parallelogram shape when viewed from the radial direction, and include wiring that is inclined +45° with respect to the axial direction of the intermediate shaft portion 3. Coil pieces 18 that are adjacent in the circumferential direction are connected in series by a conductor such as printed wiring (not illustrated).

As illustrated in FIG. 5D, the third detection coil 7 includes a plurality of coil pieces 19 arranged side by side at equal pitches in the circumferential direction. These coil pieces 19 have a parallelogram shape when viewed from the radial direction, and include wiring that is inclined −45° with respect to the axial direction of the intermediate shaft portion 3. Coil pieces 19 that are adjacent in the circumferential direction are connected in series by a conductor such as printed wiring (not illustrated).

As illustrated in FIG. 5C, the fourth detection coil 8 includes a plurality of coil pieces 20 arranged side by side at equal pitches in the circumferential direction. These coil pieces 20 have a parallelogram shape when viewed from the radial direction, and include wiring that is inclined +45° with respect to the axial direction of the intermediate shaft portion 3. Coil pieces 20 that are adjacent in the circumferential direction are connected in series by a conductor such as printed wiring (not illustrated).

However, when carrying out the present disclosure, configuration regarding the specific shape and arrangement of the first detection coil, the second detection coil, the third detection coil, and the fourth detection coil is not limited to the configuration of this example, and various conventionally known configurations may be adopted.

Figure 3:
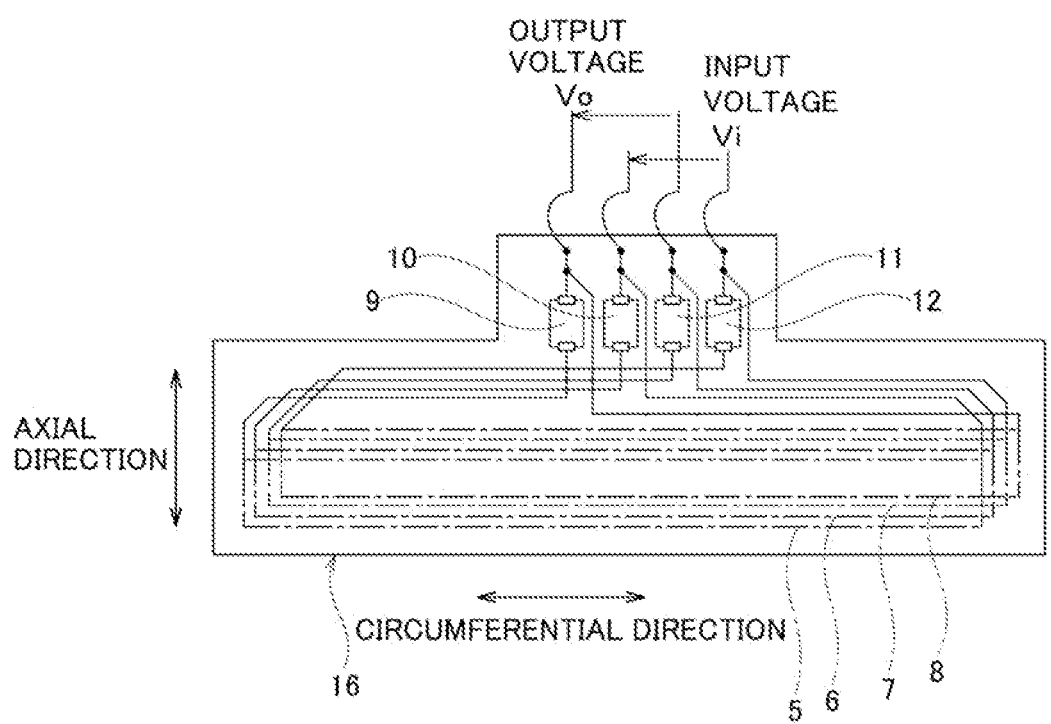
FIG. 3 is a developed view of a flexible substrate of a coil unit of the torque measuring device of the first example.

In this example, as illustrated in FIG. 3, the first resistance element 9, the second resistance element 10, the third resistance element 11, and the fourth resistance element 12 are attached by soldering, welding, or the like to part of the flexible substrate 16 (the upper part in the left-right direction central part of FIG. 3). That is, in this example, the flexible substrate 16 of the coil unit 13 has a configuration that makes it possible to attach the first resistance element 9, the second resistance element 10, the third resistance element 11, and the fourth resistance element 12 that are connected to the four sides of the bridge circuit 4.

Figure 6:
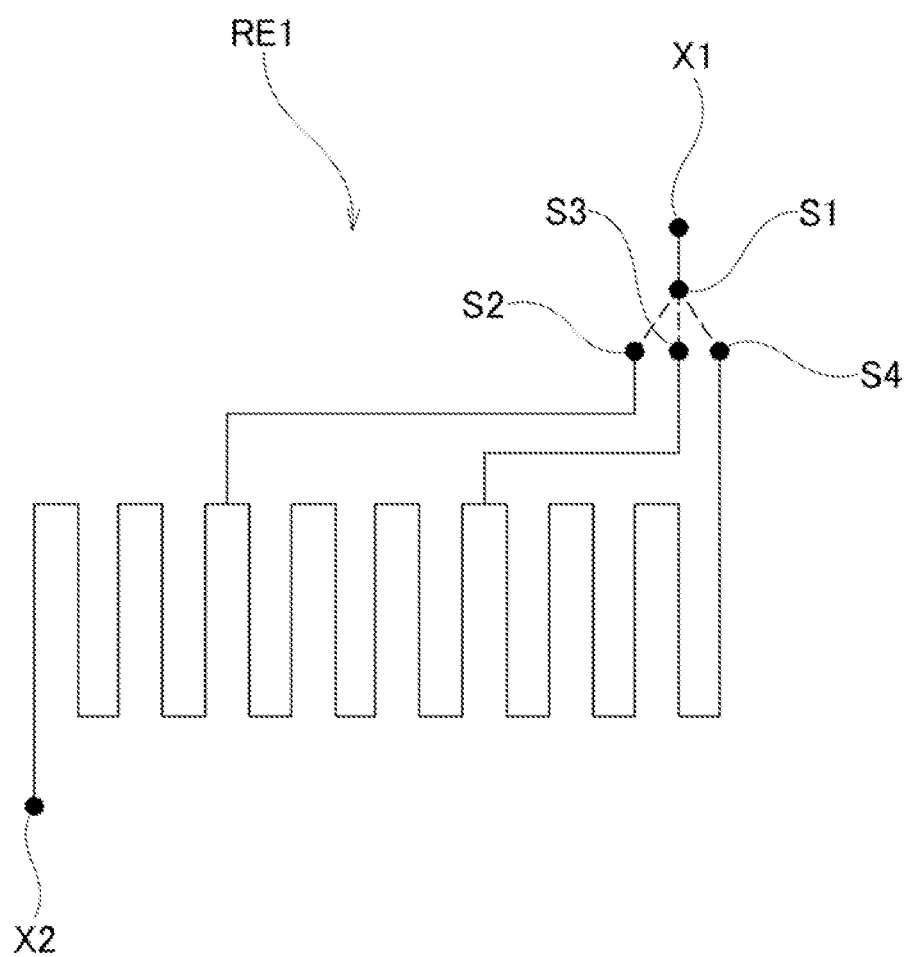
FIG. 6 is a diagram illustrating a first configuration example of resistance elements connected respectively to four sides of the bridge circuit of the torque measuring device of the first example.

In this example, as illustrated in FIG. 6, a resistor element RE1 is used for each of the resistance elements 9 to 12. The resistance element RE1 has a configuration in which the resistance value between both end points X1 and X2, which is the element's own resistance value, can be adjusted by changing the path length of the copper wire connecting the end points X1 and X2 on both sides. That is, the resistance element RE1, between the end points X1 and X2 on both sides, has a terminal S1 and a plurality of mating terminals (three terminals S2, S3, S4 in the illustrated example) that can be connected to the terminal S1 by soldering, welding, or the like.

In the resistance element RE1, it is possible to change the path length of copper wire connecting the end points X1 and X2 on both sides depending on which mating terminal (S2, S3, S4) is connected to terminal S1.

Figure 7:
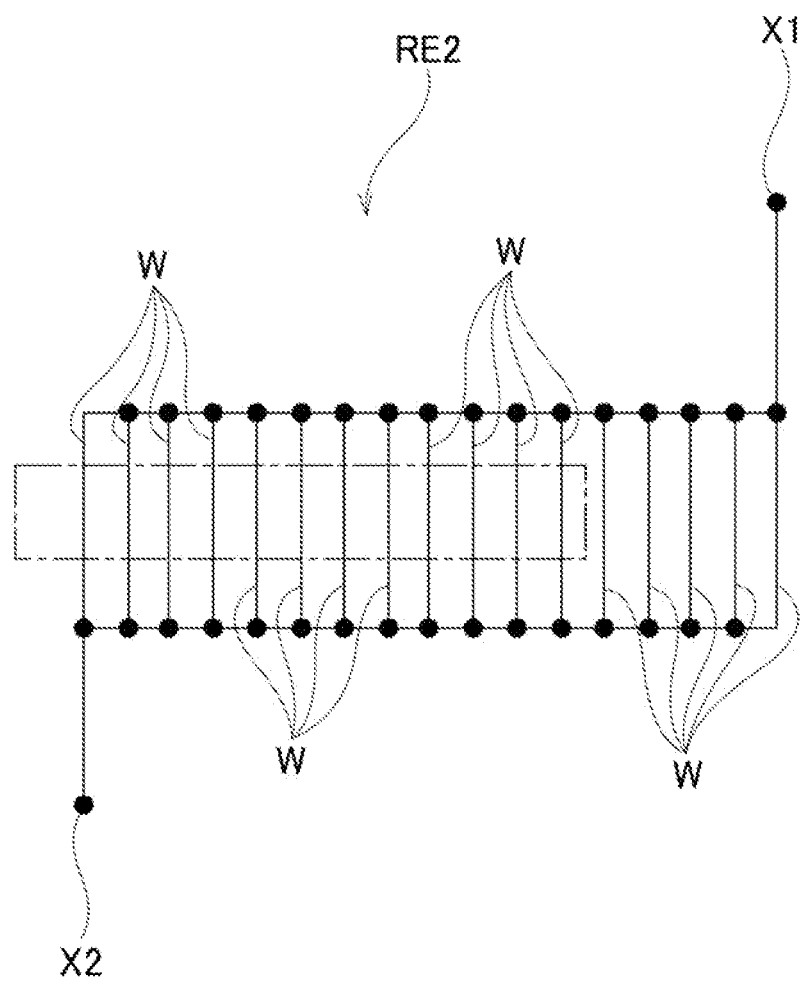
FIG. 7 is a diagram illustrating a second configuration example of resistance elements connected respectively to each of the four sides of the bridge circuit of the torque measuring device of the first example.

However, when carrying out the present disclosure, it is also possible to alternatively use a resistance element RE2 such as illustrated in FIG. 7 as each of the resistance elements 9 to 12. The resistance element RE2 has a plurality of parallel copper wires W connected in parallel in the middle of the copper wiring connecting the end points X1 and X2 on both sides. In the resistance element RE2, it is possible to change the resistance value between the end points X1 and X2 on both sides, which is the element's own resistance, by cutting a part of the parallel copper wires W out of a plurality of parallel copper wires W, for example, a portion surrounded by the dashed line in FIG. 7.

More specifically, the resistance element RE2 has a configuration in which it is possible to adjust the element's own resistance value by changing the number of parallel copper wires W to be cut, in other words, by changing the number of uncut parallel copper wires W.

Note that when carrying out the present disclosure, it is also possible to alternatively use resistance elements having a configuration that differs from that of the resistance elements RE1 (FIG. 6) and RE2 (FIG. 2) and in which it is possible to adjust the resistance value.

In any case, in this example, the resistance values of the resistance elements 9 to 12 forming the bridge circuit 4 are adjusted when the torque measuring device 1 is manufactured, and more specifically, before the resistance elements 9 to 12 are attached to the flexible substrate 16. In addition, attachment of the resistance elements 9 to 12 to the flexible substrate 16, as illustrated in FIG. 3, for example, is performed in a state before the flexible substrate 16 is rolled into a cylindrical shape.

Note that when carrying out the present disclosure, resistance elements whose resistance values cannot be adjusted may also be used instead of the resistance elements 9 to 12. In this case, a plurality of resistance elements with different resistance values are prepared. As the resistance elements 9 to 12, resistance elements having required resistance values are selected, and the selected resistance elements are attached to the flexible substrate 16.

The back yoke 14 is a member that forms a magnetic path for magnetic fluxes generated by the first detection coil 5, the second detection coil 6, the third detection coil 7, and the fourth detection coil 8. The back yoke 14 is made of a magnetic material such as mild steel and is formed in a cylindrical shape as a whole. The back yoke 14 is arranged coaxially around the coil unit 13.

In this example, in this state, a clearance in the radial direction is provided along the axial direction between the coil unit 13 and the back yoke 14. That is, an outer peripheral surface of the coil unit 13 and an inner peripheral surface of the back yoke 14 are separated in the radial direction.

The holder 15 is a member that holds the coil unit 13 and the back yoke 14, and is made of a non-magnetic material other than metal, such as synthetic resin, and has an annular shape as a whole. In this example, the holder 15 has a cylindrical holder cylindrical portion 21, a first outward-facing flange 22 extending outward in the radial direction over the entire circumference from an end portion on one side in the axial direction (left side in FIG. 1) of the holder cylindrical portion 21, and a second outward-facing flange 23 extending outward in the radial direction over the entire circumference from an end portion on the other side in the axial direction (right side in FIG. 1) of the holder cylindrical portion 21.

The outer diameter of the first outward-facing flange 22 is larger than the outer diameter of the second outward-facing flange 23. The holder 15 is supported and fixed to the casing while being arranged coaxially around the intermediate shaft portion 3.

In this example, the coil unit 13 is fitted onto an intermediate portion in the axial direction of the holder cylindrical portion 21, that is, in a portion of the holder cylindrical portion 21 that is positioned in the axial direction between the first outward-facing flange 22 and the second outward-facing flange 23.

An end surface of the back yoke 14 on the one side in the axial direction is in contact with an intermediate portion in the radial direction of a side surface on the other side in the axial direction of the first outward-facing flange 22, and an inner peripheral surface of an end portion on the other side in the axial direction of the back yoke 14 is fitted onto an outer peripheral surface of the second outward-facing flange 23 by an interference fit or the like.

Note that when carrying out the present disclosure, a configuration different from that of this example can be employed for the coil unit that includes the first detection coil 5, the second detection coil 6, the third detection coil 7, and the fourth detection coil 8 that constitute a bridge circuit 4; the back yoke arranged around the coil unit; the holder that holds the coil unit and back yoke; and the like.

In addition, the first resistance element 9, the second resistance element 10, the third resistance element 11, and the fourth resistance element 12 of the bridge circuit 4 may also be attached to a member different from the coil unit.

When using the torque measuring device 1 of this example, in the bridge circuit 4, the oscillator applies the input voltage Vi between the two end points, point A and point C, to supply an alternating current to the first detection coil 5, the second detection coil 6, the third detection coil 7, and the fourth detection coil 8. Then, as indicated by arrows $\alpha1$, $\alpha2$, $\alpha3$, and $\alpha4$ in FIG. 5A to FIG. 5D, in the first detection coil 5, the second detection coil 6, the third detection coil 7, and the fourth detection coil 8, currents flow in mutually opposite directions between pairs of coil pieces 17, 18, 19, and 20 adjacent in the circumferential direction.

In other words, pairs of coil pieces 17, 18, 19, and 20 adjacent in the circumferential direction are connected to each other so that the currents flow in such directions. As a result, an alternating magnetic field is generated around the first detection coil 5, the second detection coil 6, the third detection coil 7, and the fourth detection coil 8, and part of the magnetic flux of this alternating magnetic field passes through a surface layer portion of the intermediate shaft portion 3.

In this state, when a torque T in a direction indicated by arrow CW in FIG. 1 is applied to the intermediate shaft portion 3, a tensile stress (+$\sigma$) in a +45° direction with respect to the axial direction and a compressive stress (−$\sigma$) in a −45° direction with respect to the axial direction act on the rotating shaft 2. Then, due to an inverse magnetostriction effect, the magnetic permeability of the intermediate shaft portion 3 increases in the +45° direction, which is the direction in which the tensile stress (+$\sigma$) acts, and the magnetic permeability of the intermediate shaft portion 3 decreases in the −45° direction, which is the direction in which the compressive stress (−$\sigma$) acts.

On the other hand, the first detection coil 5 and the third detection coil 7 are configured to include wiring inclined −45° with respect to the axial direction of the intermediate shaft portion 3, and part of the magnetic flux of the alternating magnetic field generated around the wiring passes through the surface layer of the intermediate shaft portion 3 in the +45° direction, which is the direction in which the magnetic permeability increases. Therefore, the inductances L1 and L3 of the first detection coil 5 and the third detection coil 7 increase, respectively.

Moreover, the second detection coil 6 and the fourth detection coil 7 are configured to include wiring inclined +45° with respect to the axial direction of the intermediate shaft portion 3, and part of the magnetic flux of the alternating magnetic field generated around the wiring passes through the surface layer of the intermediate shaft portion 3 in the −45° direction, which is the direction in which the magnetic permeability decreases. Therefore, the inductances L2 and L4 of the second detection coil 6 and the fourth detection coil 8 decrease, respectively.

In contrast, when a torque T in the direction indicated by the arrow CCW in FIG. 1 is applied to the intermediate shaft portion 3, by the action opposite to the case described above, the inductances L1 and L3 of the first detection coil 5 and the third detection coil 7 decrease, and the inductances L2 and L4 of the second detection coil 6 and the fourth detection coil 8 increase.

In any case, in the bridge circuit 4, an output voltage Vo corresponding to the direction and magnitude of the torque T applied to the rotating shaft 2 is obtained as the voltage between the two midpoints, point B and point D. Therefore, when this output voltage Vo is measured by the voltage measuring portion, the direction and magnitude of the torque T can be obtained based on the measured output voltage Vo.

With the torque measuring device 1 of this example, it is possible to suppress changes in the output voltage Vo of the bridge circuit 4 due to temperature changes.

That is, the resistance values R1, R2, R3, and R4 of the four sides of the bridge circuit 4 increase and decrease with temperature change, and the output voltage Vo also increases and decreases with the increase and decrease. At this time, the amount of change in the output voltage Vo with respect to the temperature change increases as the variation in the resistance values R1, R2, R3, and R4 on the four sides increases. Here, when taking into consideration the ratio (R1×R3)/(R2×R4), the closer the ratio is to 1, the amount of change in the output voltage Vo becomes small with respect to the temperature change.

In this regard, in this example, the resistance values of resistance elements 9 to 12 connected to each of the four sides are adjusted so that the ratio (R1×R3)/(R2×R4) approaches 1 compared to the case where the resistance elements 9 to 12 are not connected to the four sides. Therefore, it is possible to suppress the change in the output voltage Vo of the bridge circuit 4 due to the temperature change.

Second Example

Figure 8:
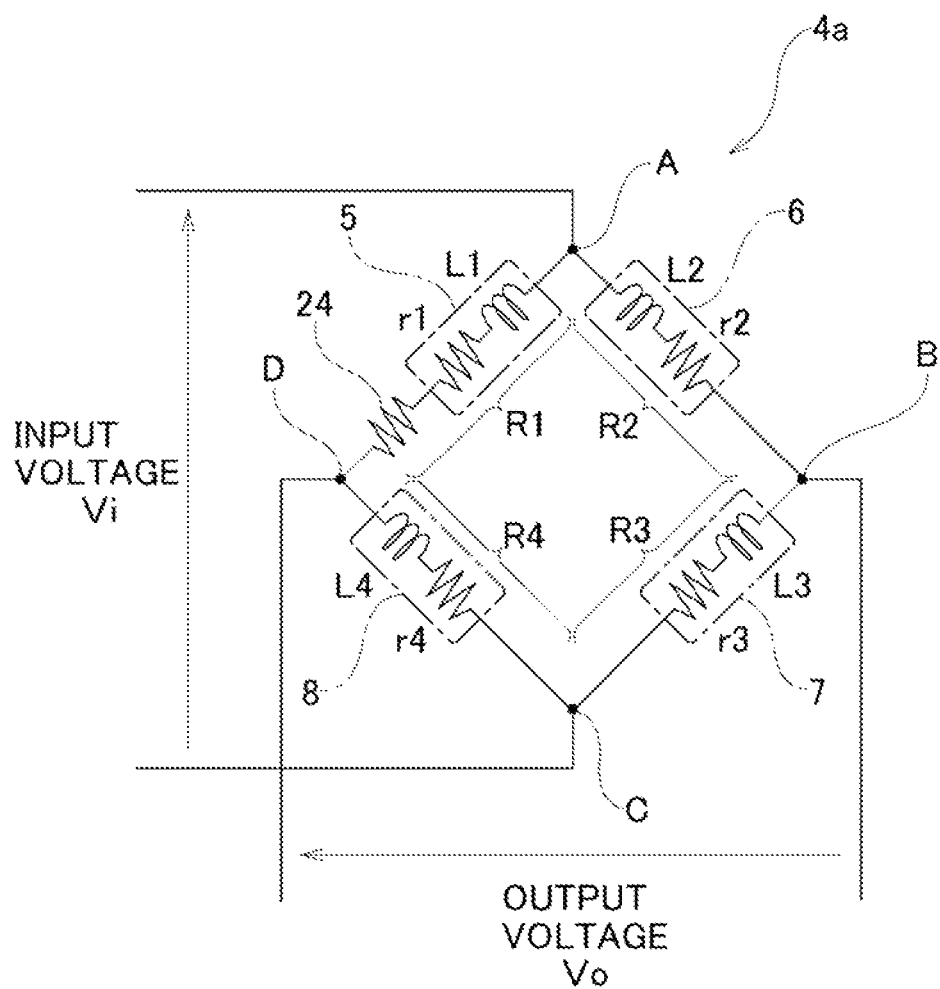
FIG. 8 is a diagram corresponding to FIG. 2 in a second example of an embodiment of the present disclosure.
Figure 9:
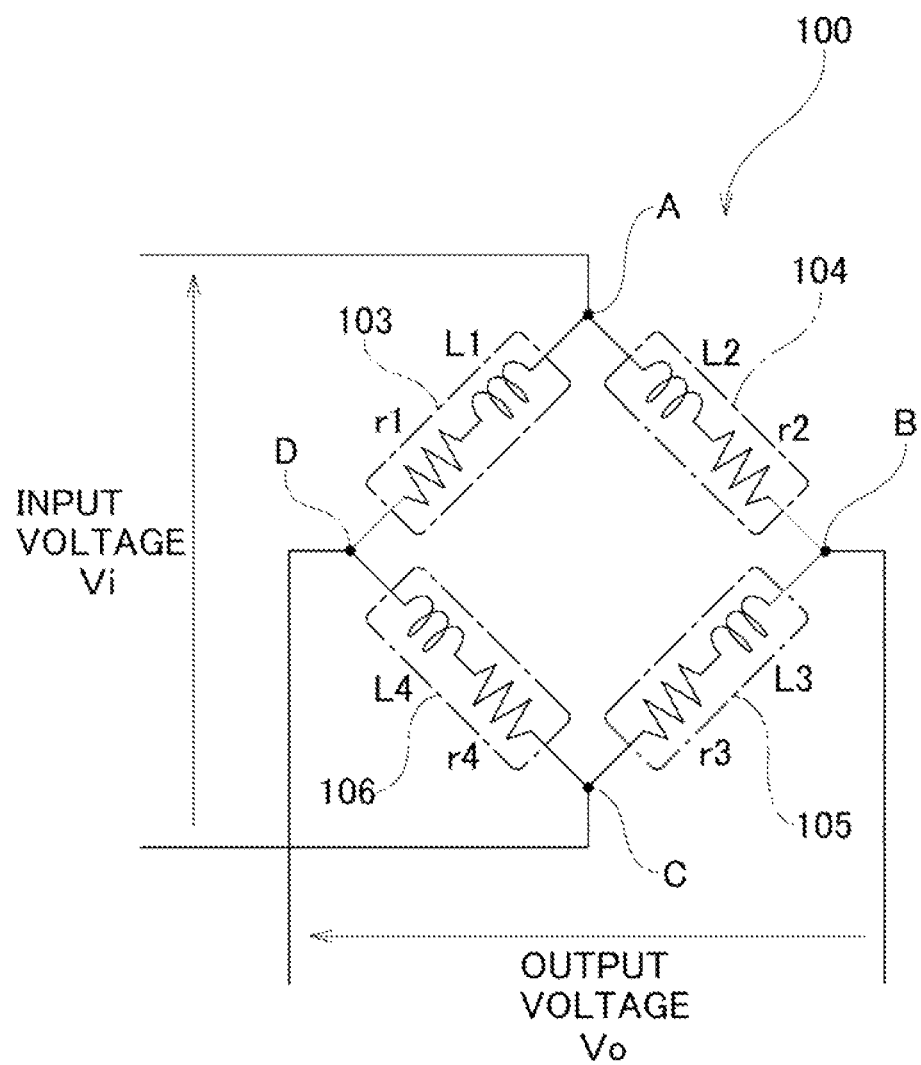
FIG. 9 is a diagram illustrating a bridge circuit of a conventional torque measuring device.
Figure 10:
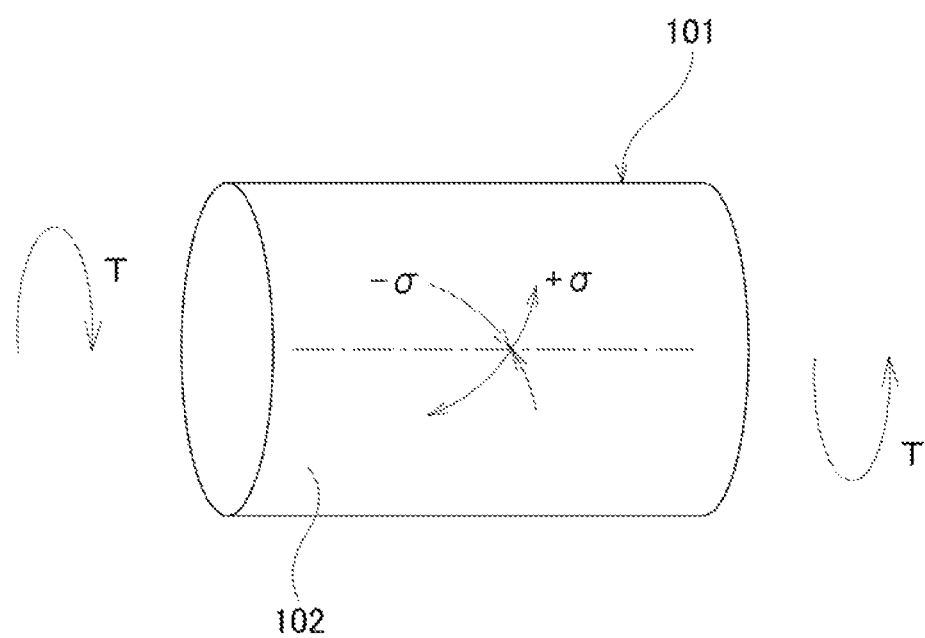
FIG. 10 is a perspective view of a rotating shaft for explaining a direction of stress generated when torque is applied to the rotating shaft.

A second example of an embodiment of the present disclosure will be described with reference to FIG. 8.

In this example, a bridge circuit 4a has a resistance element 24 connected to only one of four sides. Note that in FIG. 8, the resistance element 24 is connected to a side where a first detection coil 5 exists; however, this is merely an example. In this example, in the bridge circuit 4a, a resistance value of the resistance element 24 is adjusted so that a ratio (R1×R3)/(R2×R4) approaches 1 compared to when the resistance element 24 is not connected.

For this reason, in this example, before connecting the resistance element 24 to one of the four sides of the bridge circuit 4a, resistance values of respective resistance components r1, r2, r3, and r4 of the first detection coil 5, the second detection coil 6, the third detection coil 7, and the fourth detection coil 8 are measured with a tester. The resistance values of the resistance components r1, r2, r3, and r4 that are measured in this way, and the resistance value of the resistance element 24 are combined, and the resistance value of the resistance element 24 is adjusted so that the ratio (R1×R3)/(R2×R4) approaches 1.

In this example, of the detection coils 5 to 8 on the four sides, the resistance element 24 is connected to the side where the detection coil having the smallest resistance value of the resistance components r1, r2, r3, and r4 measured by the tester exists. For example, in a case where the detection coil with the smallest resistance value of the resistance components measured by the tester is the first detection coil 5, as illustrated in FIG. 8, the resistance element 24 is connected to the side where the first detection coil 5 exists. At this time, the resistance value of the resistance element 24 is adjusted so that the ratio (R1×R3)/(R2×R4) approaches 1 before connecting the resistance element 24 to the side of the bridge circuit 4a.

Other configurations and effects are the same as those of the first example.

When carrying out the present disclosure, it is also possible to adopt a configuration in which resistance elements for adjusting the resistance value of the sides are connected only to any two or three sides of the four sides of the bridge circuit. In these cases as well, by adjusting the resistance values of the respective resistance elements on the two or three sides, the ratio (R1×R3)/(R2×R4) can be made to approach 1 compared to when these resistance elements are not connected.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting.

It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

REFERENCE SIGNS LIST

1 Torque measuring device
2 Rotating shaft
3 Intermediate shaft portion
4, 4a Bridge circuit
5 First detection coil
6 Second detection coil
7 Third detection coil
8 Fourth detection coil
9 First resistance element
10 Second resistance element
11 Third resistance element
12 Fourth resistance element
13 Coil unit
14 Back yoke
15 Holder 16 Flexible substrate
17 Coil piece
18 Coil piece
19 Coil piece
20 Coil piece
21 Holder cylindrical portion
22 First outward-facing flange
23 Second outward-facing flange
24 Resistance element
100 Bridge circuit
101 Rotating shaft
102 Magnetostrictive effect section
103 First detection coil
104 Second detection coil
105 Third detection coil
106 Fourth detection coil

The invention claimed is:

1. A torque measuring device comprising a bridge circuit in which four detection coils arranged around a magnetostrictive effect section of a rotating shaft are arranged on four sides; wherein
the bridge circuit includes a resistance element connected to at least one of the four sides, and
the resistance element is connected to the at least one of the four sides in a state in which a resistance value of the resistance element is adjusted so that a ratio (R1×R3)/(R2×R4) of a product R1×R3 of resistance values R1 and R3 of two opposite sides forming one pair of opposite sides of the four sides, and a product R2×R4 of resistance values R2 and R4 of two opposite sides forming another pair of opposite sides of the four sides approaches 1, the resistance values R1, R2, R3, and R4 of the four sides measured in advance before the resistance element is connected to the at least one of the four sides.

2. The torque measuring device according to claim 1, wherein the bridge circuit includes four resistance elements respectively configured by the resistance element and connected to one each of the four sides.

3. The torque measuring device according to claim 1, wherein the resistance element has a configuration in which the resistance value between end points on both sides of the resistance element, which is the resistance value of the resistance element, is adjustable by changing a path length of copper wire connecting the end points on both sides of the resistance element.

4. The torque measuring device according to claim 1, wherein the resistance element has a configuration in which a plurality of parallel copper wires are connected in parallel in a middle of the copper wiring connecting the end points on both sides of the resistance element, and the resistance value between the end points on both sides, which is the resistance value of the resistance element, is adjustable by changing the number of the plurality of parallel copper wires by cutting a part of the plurality of parallel copper wires.

5. The torque measuring device according to claim 1, further comprising:
a coil unit formed in a cylindrical shape and including the four detection coils;
a back yoke formed in a cylindrical shape and arranged coaxially around the coil unit; and
a holder configured to hold the coil unit and the back yoke.

* * * * *